US010349758B2

(12) United States Patent
Haroush (10) Patent No.: US 10,349,758 B2
(45) Date of Patent: Jul. 16, 2019

(54) MOUNT OR STAND FOR PRESENTATION OF WEARABLE ELECTRONIC PRODUCTS (71) Applicant: Outform Ltd., Moshav Magshimim (IL)

(72) Inventor: Ariel Haroush, North Miami, FL (US)

(73) Assignee: Outform Ltd., Moshav Magshimim (IL)

( * ) Notice: Subject to any disclaimer, the term of this patent is extended or adjusted under 35 U.S.C. 154(b) by 0 days.

(21) Appl. No.: 15/567,614

(22) PCT Filed: Feb. 8, 2016

(86) PCT No.: PCT/IL2016/050143
§ 371 (c)(1),
(2) Date: Oct. 19, 2017

(87) PCT Pub. No.: WO2016/170524
PCT Pub. Date: Oct. 27, 2016

(65) Prior Publication Data
US 2018/0153317 A1 Jun. 7, 2018

Related U.S. Application Data

(60) Provisional application No. 62/172,292, filed on Jun. 8, 2015, provisional application No. 62/149,615, filed on Apr. 19, 2015.

(51) Int. Cl.
*H02J 7/00* (2006.01)
*A47F 7/024* (2006.01)
(Continued)

(52) U.S. Cl.
CPC .............. *A47F 7/024* (2013.01); *A47F 3/002* (2013.01); *A47F 7/022* (2013.01); *H02J 7/0044* (2013.01)

(58) Field of Classification Search
CPC .. H02J 7/0042; H02J 7/0044; G08B 13/1463; A47F 7/022; A47F 7/024; A47F 3/002
(Continued)

(56) References Cited

U.S. PATENT DOCUMENTS

2009/0173863 A1 7/2009 Crown
2014/0059828 A1 3/2014 Reynolds et al.
(Continued)

FOREIGN PATENT DOCUMENTS

DE 1561559 8/1970
EP 2810588 12/2014
(Continued)

OTHER PUBLICATIONS

International Preliminary Report on Patentability dated Mar. 21, 2017 from the International Preliminary Examining Authority Re. Application No. PCT/IL2016/050143. (10 Pages).
(Continued)

*Primary Examiner* — Paul Dinh (57) ABSTRACT

A secure display stand for a wearable comprises a socket for fixing to a display cabinet or mounting, a bracelet lock for locking around a bracelet or strap of a wearable to be displayed; and a bracket extending from the bracelet lock, the bracket having a charging element for charging of the wearable, wherein the bracelet lock is attached by a retractable cord to the socket.

13 Claims, 12 Drawing Sheets (51) Int. Cl.
 *A47F 7/02* (2006.01)
 *A47F 3/00* (2006.01)
(58) Field of Classification Search
 USPC .......................................................... 320/115
 See application file for complete search history.

(56) References Cited

U.S. PATENT DOCUMENTS

2014/0106608 A1   4/2014  Howarth et al.
2018/0153317 A1*  6/2018  Haroush ................ A47F 7/022

FOREIGN PATENT DOCUMENTS

GB           588400      5/1947
WO       WO 01/97661   12/2001
WO     WO 2016/170524  10/2016

OTHER PUBLICATIONS

International Search Report and the Written Opinion dated May 4, 2016 From the International Searching Authority Re. Application No. PCT/IL2016/050143.

* cited by examiner

MOUNT OR STAND FOR PRESENTATION OF WEARABLE ELECTRONIC PRODUCTS

RELATED APPLICATIONS

This application is a National Phase of PCT Patent Application No. PCT/IL2016/050143 having International filing date of Feb. 8, 2016, which claims the benefit of priority under 35 USC § 119(e) of U.S. Provisional Patent Application Nos. 62/172,292 filed on Jun. 8, 2015 and 62/149,615 filed on Apr. 19, 2015. The contents of the above applications are all incorporated by reference as if fully set forth herein in their entirety.

FIELD AND BACKGROUND OF THE INVENTION

The present invention, in some embodiments thereof, relates to a stand, or a mount and a stand, for presentation of electronic products for display or sale and, more particularly, but not exclusively, to a modular system intended to cater for wearable electronic products, hereinafter wearables.

Wearables, such as smart watches, sports monitors and the like, are increasingly available on the high street and shops selling the wearables are facing unique issues in presenting these products to the consuming public. The devices require a steady electricity supply, as the screen display requires power and needs to be shown as part of the display to the customer. In some cases data connections may also be required to provide data to the device. The devices are small and relatively expensive, making them attractive for thieves, and the personal nature of the devices means that allowing the customer to try them on is required.

Thus to date, shops selling wearables have mounted the devices on display stands where they can be attached to chargers, and have generally required staff to be on hand to show the devices to customers.

Current solutions allow the wearable to be charged, or allow the wearable to be secure, or allow the wearable to be easily handled by the consumer. The better solutions allow two out of the above three, but no solution provides for all three together.

Figure 1A:
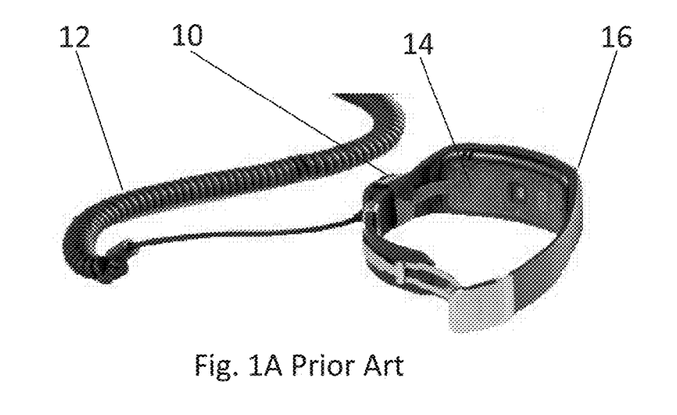
FIGS. 1A to 1D show a selection of prior art solutions for displaying wearables for sale in a retail environment.

Four existing solutions are shown in FIGS. 1A to 1D. FIG. 1A illustrates a solution in which a band 10 is placed around a watch strap. The band is attached to electrical cord 12 and an extension 14 of the band reaches the underside of the watch 16 being displayed. The solution has the drawback that it has to be customized for different models of wearable. There are sharp or more generally exposed edges which make the watch uncomfortable to wear. There is nothing to encourage the customer to replace the watch in a displayable position or onto a docking station, and finally, for some devices the solution lacks a charging function.

Figure 1B:
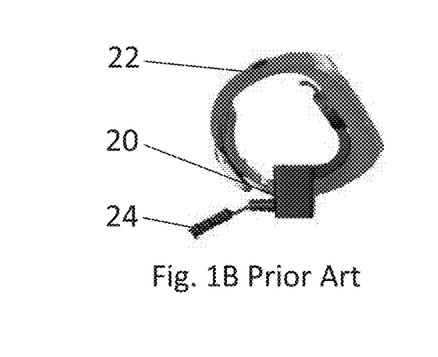

FIG. 1B is another solution, in which band 20 fits over the bracelet or strap of watch 22 and is electrically connected via cord 24 to an alarm and power supply. The solution has no charging function, and the band 20 does not allow customers to try the watch on their wrists or experience the watch as a personal product.

Figure 1C:
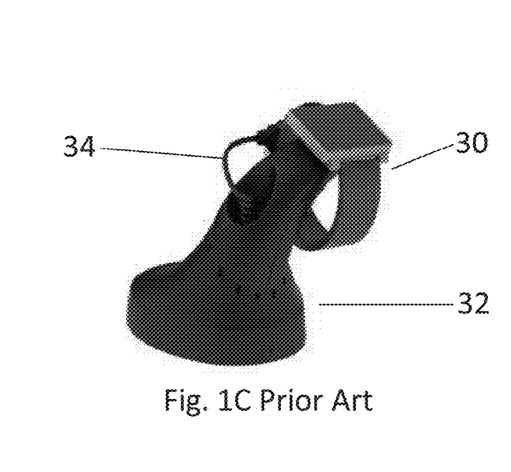

FIG. 1C illustrates another solution, in which a wearable 30 is placed on display stand 32. The display stand has an internally connected cord 34 which is fixed around the bracelet or strap of the wearable. The wearable may be lifted from the display stand and the user is able to place the wearable on the arm. An attempt to disconnect the wearable operates an alarm. The wearable cannot be charged and although the strap is secured, the customer could cut the strap and take the wearable itself without setting off the alarm. Furthermore the display stand 32 is large and detracts from the aesthetics.

Figure 1D:
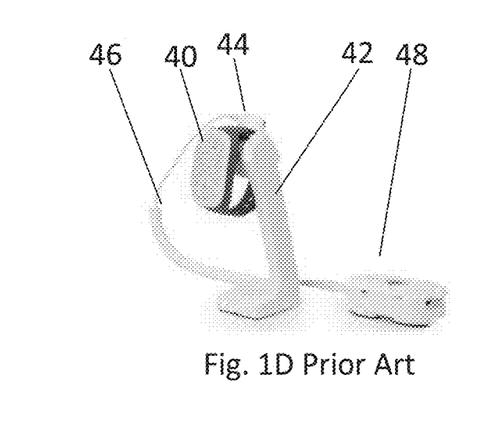

FIG. 1D illustrates a fourth solution, in which wearable 40 is placed on a horizontally extending arm of stand 42. The wearable is secured by plug 44 which is itself connected via cord 46 and alarm unit 48 back to the stand 42. The stand is limited to a single wearable and the protruding wires detract from the aesthetics of the product. Furthermore it is easy for the customer to replace the wearable in the reverse orientation, thus failing to display the wearable.

SUMMARY OF THE INVENTION

The present embodiments provide a display system that can be fitted to a wall such as that of a display case or sales stand or to the wall of a shop, where individual sockets hold the wearable, provide the wearable with power and data, and provide for an anti-theft system. As many sockets as desired may be placed together on a mounting. The units allow the device to be handled and inspected by the public, and the system may provide power, data and an anti-theft system, while allowing the product to be worn, handled and investigated in convenient manner by the intended purchaser.

Alternative embodiments provide a charging display stand that provides a charging base, that ensures that the wearable is correctly replaced in a position in which it is able to charge, which can be extended to be tried on by the customer and which may trigger an alarm if an unauthorized attempt is made to remove the wearable or even a part of the wearable.

According to one aspect of the present invention there is provided a secure display stand for a wearable comprising:
a socket;
a bracelet lock for locking around a bracelet or strap of a wearable to be displayed; and
a bracket extending from said bracelet lock, the bracket having a charging element for charging of said wearable, wherein the bracelet lock is attached by a retractable cord to the socket.

An embodiment may have a retracted position in which said bracelet lock is located in said socket and an extended position in which said bracelet lock is pulled away from said socket to allow a customer to wear or inspect said wearable.

In an embodiment, said bracket comprises an arc and is configured to fit under said strap or bracelet.

In an embodiment said bracket is configured to hold said strap or bracelet open as if being worn.

In an embodiment said charging element is located at a distance from said bracelet lock to engage a housing of said wearable.

In an embodiment said charging element and said bracket form a continuum.

In an embodiment said charging element is configured for wireless charging of said wearable.

In an embodiment said charging element is configured to engage a charging contact of said housing.

In an embodiment, said charging element comprises a back plate continuous with said bracket and a modular charging cap for engagement with said wearable, wherein said modular charging cap is exchangeable.

In an embodiment, said bracket lock comprises a body and a cover releasably attached thereto, said bracket extending from said cover, and wherein said body and said cover when attached define an insertion space large enough for said strap or bracelet to fit through, said cover being tightenable to hold said strap or bracelet firmly in said space.

The strap or bracelet of said wearable may have a buckle, and the bracket may have a travel stop at an end opposite said cover to hook said buckle onto said bracket.

An embodiment may comprise an alarm which can be set to provide an indication of either one or both of detachment of said housing from said charging plate and removal of said strap or bracelet from said bracelet lock.

An embodiment may be configured to charge the wearable through said charging element at least when in said retracted position.

According to a second aspect of the present invention there is provided a method of displaying wearables in electronically activated manner, said wearables having a housing and a strap or bracelet with a buckle, the method comprising:
mounting a wearable on an open arc-shaped bracket, the bracket being connected to a mounting via a tensioned cord, to allow an extended position for said wearable for inspection,
hooking said buckle onto a first end of said bracket,
locating said housing onto a charging element on said bracket,
closing a bracelet lock at a second end of said bracket over said bracelet or strap;
supplying power to said wearable via said bracket and said charging element; and
sensing said wearable, such that removal of said wearable triggers an alarm.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a stand, or a mount with a stand, for presentation of wearable electronic products and, more particularly, but not exclusively, to such a stand, or a mount with a stand, for presentation of the wearable in a retail environment.

A stand, or the mount with a stand, according to the present embodiments may provide power to the wearable, allow a customer to inspect, test and wear the wearable and may encourage or assist the customers in replacing the wearable in the display position after inspection.

The embodiments may engage the wearable at two or three locations, connecting to the strap or bracelet of the wearable, a buckle, and engaging a surface of the housing of the wearable through a shaped bracket which follows the contours of the strap or bracelet. A bracelet lock fits over the strap or bracelet and holds the strap or bracelet within. At its other end, the bracelet lock is attached by a tensioned connection to a socket on a mount so that the bracelet lock is retracted towards the socket after use. When in the retracted position on the socket, power is transmitted to the bracelet lock, and from the bracelet lock along the shaped bracket to the housing engagement. The housing engagement provides power and possibly also data to the wearable through the housing. As will be explained, power to the wearable may be provided contactlessly through the housing or via a contact point, and indeed many wearables are designed for contactless charging.

Disconnection of the wearable, either at the housing or at the strap, may set off an alarm.

In an embodiment, the tensioned connection is also an electrical conductor. In other embodiments the tensioned connection does not conduct power or signals. Electrical connection between the socket and the bracelet lock may be via contacts or may be wireless.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention, in some embodiments thereof, relates to a system for presentation of electronic products for display or sale and, more particularly, but not exclusively, to a modular system intended to cater for wearable electronic products, hereinafter wearables.

Figure 2A:
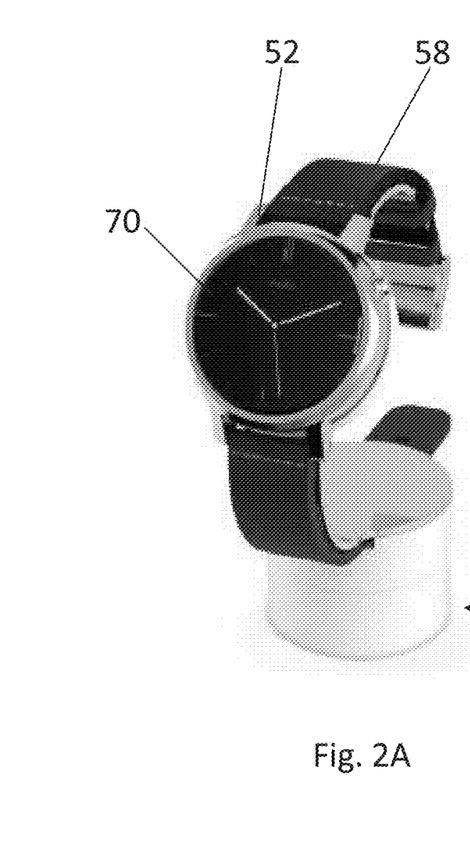
FIGS. 2A-2C are three perspective views of a wearable mounted for display on a stand according to embodiments of the present invention.
Figures 2B, 2C:
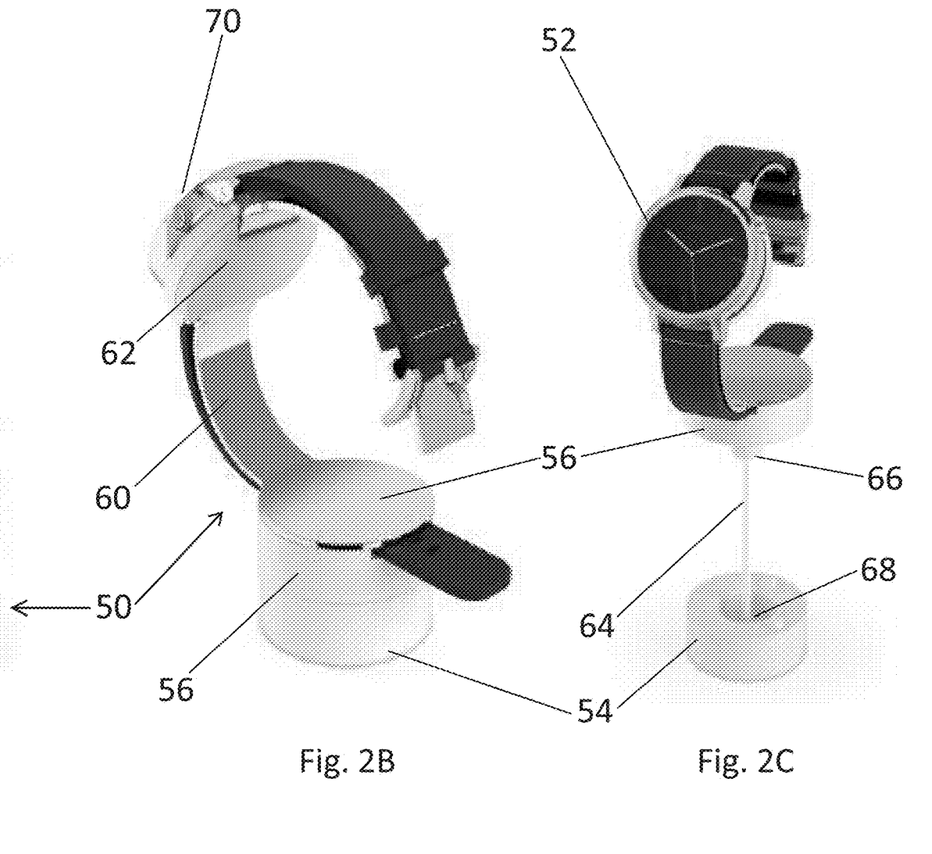

Reference is now made to FIGS. 2A, 2B and 2C, which illustrate three different perspective views of a display stand with a watch according to the present embodiments. The watch is purely exemplary of the class of electronic products known as wearables, and other wearables include spectacles, sports sensors and medical sensors. The display stands may be fixed into mounts which in turn may be fixed to a wall or display cabinet in a shop. The mount may include data and power connectors to the stand and the attached wearable that is being displayed. The display stand may be connected to the mount or directly to the display cabinet or wall via a tensioned cord so that it can be pulled out by a user and investigated but always returns to the charging position following use.

The secure display stand 50 for a wearable 52 such as a smart watch may include a socket 54 that may be mounted on a display base or into a display cabinet or the like.

A bracelet lock 56 locks around a bracelet or strap 58 of the wearable 52. A bracket 60 extends from the bracelet lock 56. The bracket has a charging element 62 for charging of the wearable, and the bracelet lock 56 is attached by a retractable cord 64 to the socket 54.

FIGS. 2A and 2B show a retracted position in which the bracelet lock 56 is located in the socket 54. The retracted position is the position in which the wearable is displayed. FIG. 2C shows an extended position in which the bracelet lock 56 is pulled away from the socket 54 to allow a customer to wear or inspect the wearable. Retractable cord 64 is tensioned to pull the bracelet lock 56 back to the socket 54 and to locate on the socket 54. Typically the bracelet lock and the socket have complementary shapes allowing them to mate together. As shown the bracelet lock has protrusion 66 which mates with cylindrical inclusion 68 in the socket, but any complementary shaping may be suitable. In particular the shaping may be rounded so that tension from the cord can align the two shapes. As will be discussed below, the bracelet lock and the socket may have magnets to pull the parts into mating engagement.

Bracket 60 may be arc-shaped and is intended to fit under the strap or bracelet 58 so that it is not immediately noticeable to the customer. Nevertheless the bracket, being placed under the strap 58, gives the wearable the shape of being worn, or holds the strap or bracelet open as if being worn. The bracket thus adds to the aesthetics of the display by giving the wearable the appearance of being worn and also adds to the ergonomics by allowing the wearable to be placed as is on the person.

The charging element 62 is located at a distance along the bracket 60 from the bracelet lock 54 to engage housing 70 of the wearable 52. The housing is the part of the wearable containing the main electronics, sensors and display as appropriate to the particular wearable. Typically the housing is engaged from behind so that the front of the housing 70 may be displayed to the customer without interference. Typically the charging element is sized so that when engaged with the back of the housing it is not noticeable from the front. The charging element may also be flush or substantially flush with the bracket so as not to be felt when the customer tries on the wearable. That is to say the charging element 62 and the bracket are intended to form a substantially smooth continuum that feels comfortable to bare skin.

Reference is now made to FIGS. 3A to 3D which show the display stand without the wearable. The display stand 50 is in the retracted position with the bracelet lock 56 engaged in the socket 54. Bracket 60 extends in an open arc from the bracelet lock 56, and more particularly from a removable cover part 72 of the bracelet lock, as will be explained in greater detail below. The removable cover part 72 may be continuous with the bracket, again to feel comfortable to the wearer.

Figures 3A, 3B:
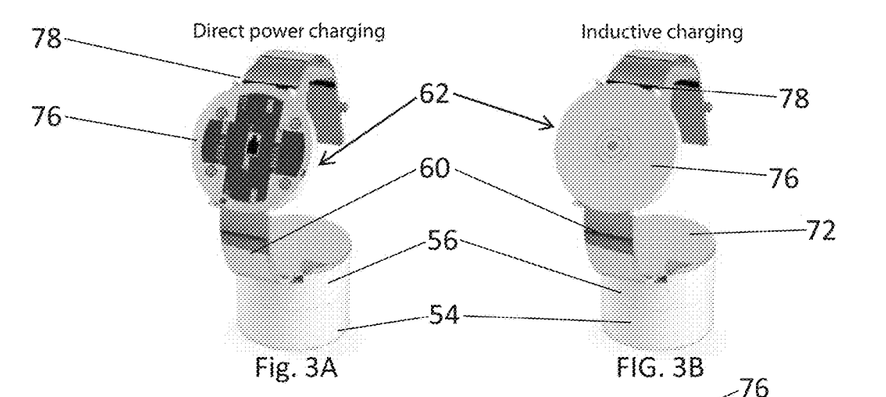
FIGS. 3A-3D are four perspective views showing different embodiments of a modular charging cap of the present embodiments.
Figures 3C, 3D:
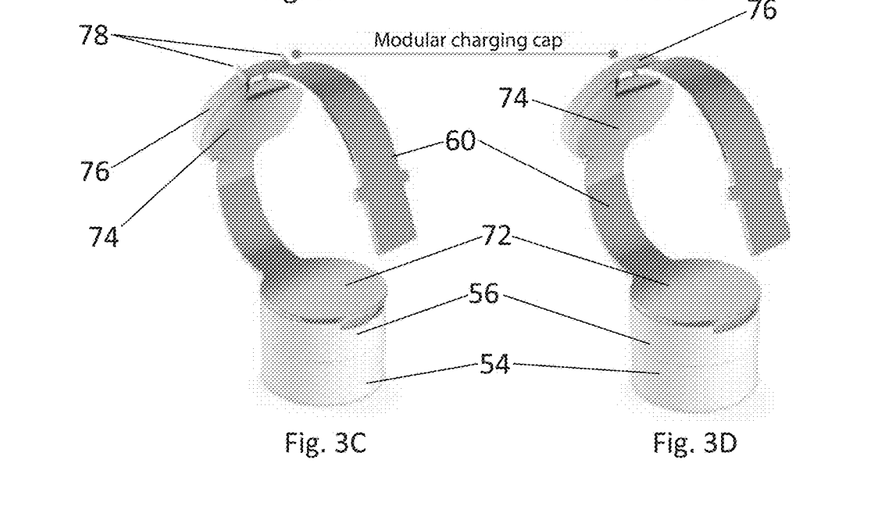

Charging element 62 comprises a back plate 74 and a modular charging cap 76. The modular charging cap is a removable part which can be exchanged and provides charging and data for the wearable. Insofar as the wearables are not standardized the charging cap is the only part of the display that needs to be changed to accommodate a particular wearable. FIG. 3A illustrates a modular charging cap with contacts for fitting onto the wearable. The contacts may engage corresponding charging contacts in the housing and providing for direct power charging. FIG. 3B illustrates a modular charging cap 76 for inductive, or wireless, charging. FIG. 3c is a view from behind showing the modular charging cap of FIGS. 3A and 3B and particularly showing location guides 78, which guide correct location of the wearable housing onto the charging element. FIG. 3D is a view from behind of a variation of the modular charging cap without location guides.

Figures 4A, 4B:
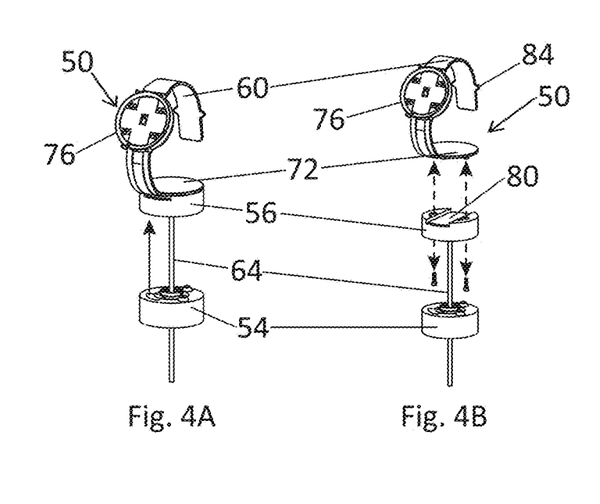
FIGS. 4A-4E are five figures showing successive actions in placing a wearable on a stand according to the present embodiments.

Reference is now made to FIGS. 4A to 4E, which illustrate the placement of the wearable on the stand and within the bracelet lock. Parts that appear in previous figures are given the same reference numerals and are discussed only in so far as needed for an understanding of the present figure. FIG. 4A illustrates the display stand 50 without a wearable. The bracelet lock 56 is extended from the socket 54. As shown in FIG. 4B, the removable cover part 72 is removed from the body of the bracelet lock 54. Typically the removable cover part is attached by steel screws—not shown—so that removal requires at least a screwdriver. Removal of the cover part reveals groove 80, which is shaped to correspond to the strap or bracelet 58 of the wearable. The groove 80 is sized so that when the removable cover part 72 is tightly screwed in position, a gap is formed which tightly holds the strap or bracelet 58 by pressing of the cover onto the strap or bracelet.

Figure 4C:
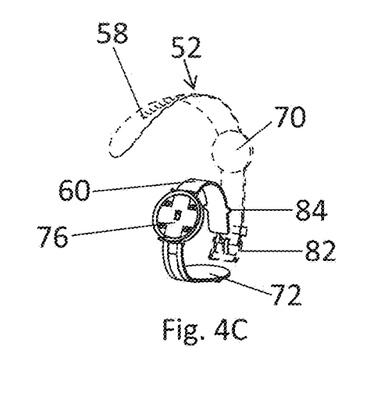
Figure 4D:
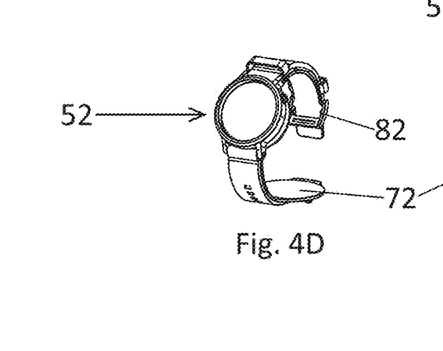
Figure 4E:
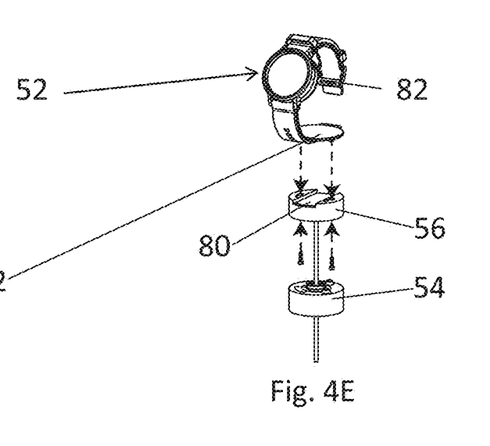

As shown in FIGS. 4C and 4D, the wearable 52 is hooked via buckle 82 onto one end of the bracket 60. The buckle 60 is firmly held on the end of the bracket with limiter lugs 84 that prevent the buckle from riding up the bracket. Housing 70 is then fitted over the charging element 62 and the strap or bracelet 58 is pulled to removable cover part 72. As shown in FIG. 4D, the removable cover part is screwed back on to bracelet lock 56 with the bracelet or strap located firmly in groove 80.

Figure 5:
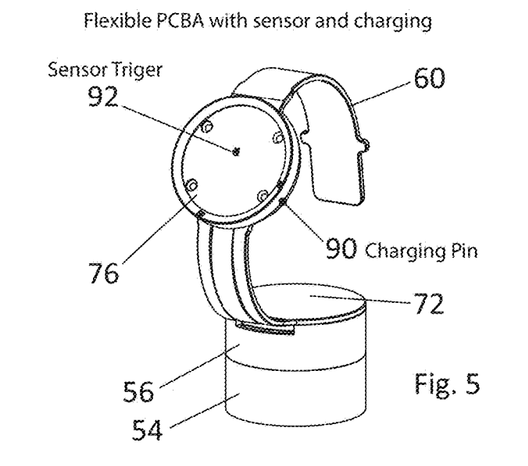
FIG. 5 is a simplified diagram showing a touch sensor on a modular charging cap according to the present embodiments.

Reference is now made to FIG. 5, which illustrates how the charging element may be alarmed to secure the wearable against theft. A modular charging cap 76 for direct contact charging is shown merely by way of example and the same applies to other forms of modular charging cap. The cap includes a charging contact 90 and a contact sensor 92. The contact sensor 92 senses when contact with the wearable is lost and sends a signal to an alarm. The alarm uses the signal to provide an indication of detachment of the wearable, and buzzer or lights or the like indication may be activated. A similar sensor may be located in the bracelet lock 56 to indicate removal of the bracelet or strap, or to indicate attempts being made to detach the removable cover 72.

The wearable may be connected to the electricity supply for charging at least when the stand is in the retracted position. In some embodiments the retractable cord contains an electricity supply so that power continues to be applied in the extended position.

Figure 6:
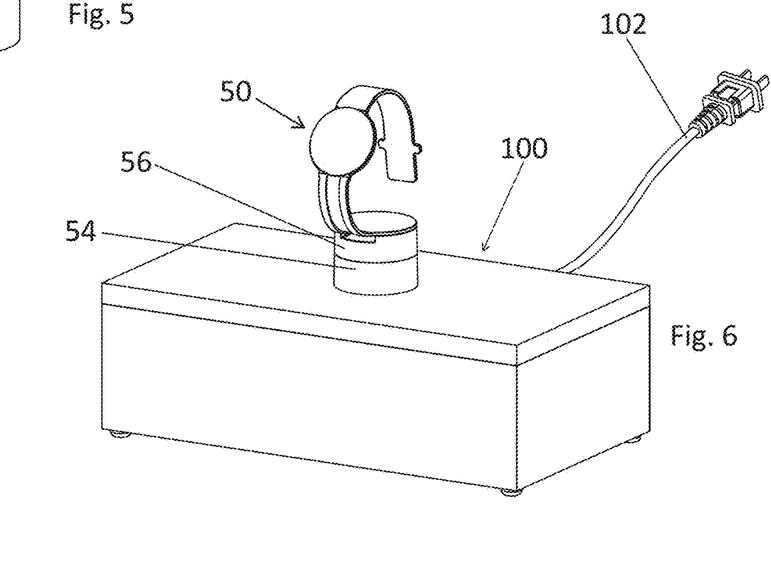
FIG. 6 is a simplified three-dimensional drawing of the stand of the present embodiments on a mounting.

Reference is now made to FIG. 6, which is a simplified diagram showing the stand of the present embodiments on a mount. Mount 100 may be part of a display cabinet or wall mounting, and receive an electricity supply via wire 102. The stand 50 is attached to the mount 100 via socket 54. As will be explained, the mount 100 may contain the electronics for an alarm system, as well as a power supply for the stand and a tensioned cable winding for the retractable cable.

Figure 7:
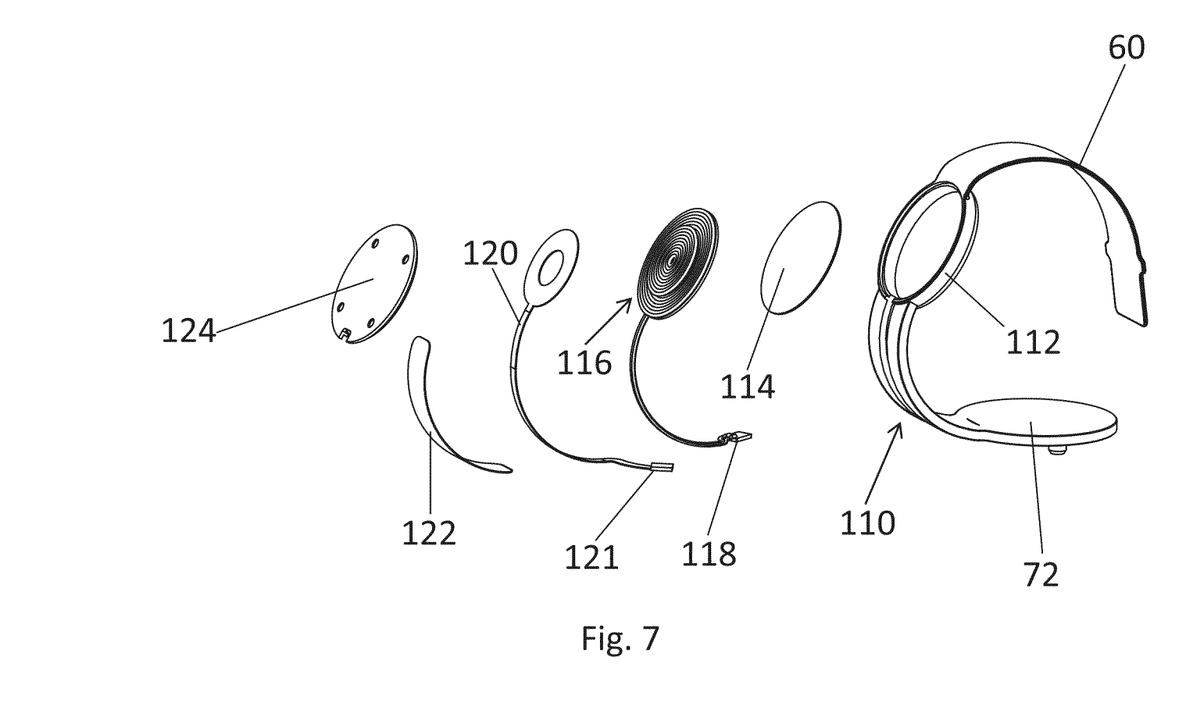
FIG. 7 is a simplified exploded diagram showing the construction of a bracket and a charging element according to the present embodiments.

Reference is now made to FIG. 7, which is a simplified exploded diagram showing the parts making up the bracket and charging element of the wireless charger embodiment. Shaped metal element 110 includes the removable cover 72 of the bracelet lock, the open arc-shaped bracket 60 and a charger housing 112 for the charging element. Magnetic plate 114 fits in the charger housing 112 to hold the housing 70 of the wearable in place magnetically. Coiled wiring arrangement 116 provides a field for inductive coupling to charge the wearable. The arrangement makes electrical contact, through the base of the removable cover 72, via connector 118. Flexible printed circuit (FPC) cable 120 provides an electrical connection for the alarm sensor via connector 121. The arrangement is covered by aluminized paper 122 and wireless charger cover 124 is fitted over the top.

Figure 8:
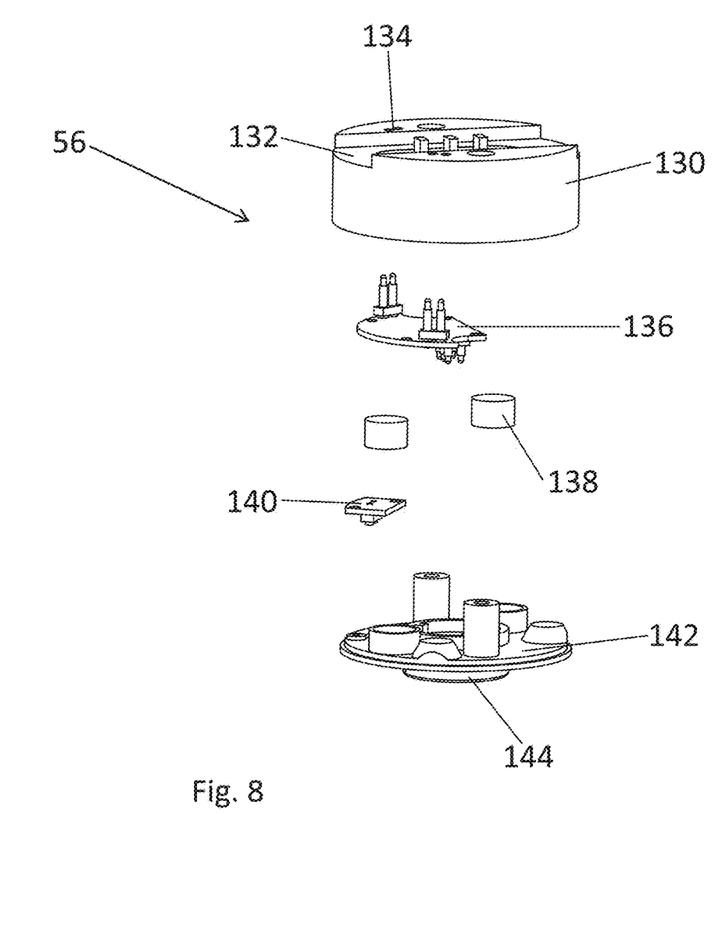
FIG. 8 is a simplified exploded diagram showing construction of a bracelet lock according to an embodiment of the present invention.

Reference is now made to FIG. 8, which is a simplified exploded diagram showing the construction of the lower part of the bracelet lock, not including the removable cover, according to embodiments of the present invention. Bracelet lock 56 includes housing 130 which in turn contains groove 132 to receive the bracelet or strap 58. Contact locations 134 mate with pogo pin and transfer PCB 136 to pass power to the wearable and transfer signals to and from the wearable. Magnets 138 ensure that when the bracelet lock is in position it is engagingly connected to socket 54. Pogo pin connector 140 provides an electrical connection to the socket and housing 142 provides an outer cover. Mating protrusion 144 extends from the outer cover to provide a shape for mating with a corresponding shape on the socket 54.

Figure 9:
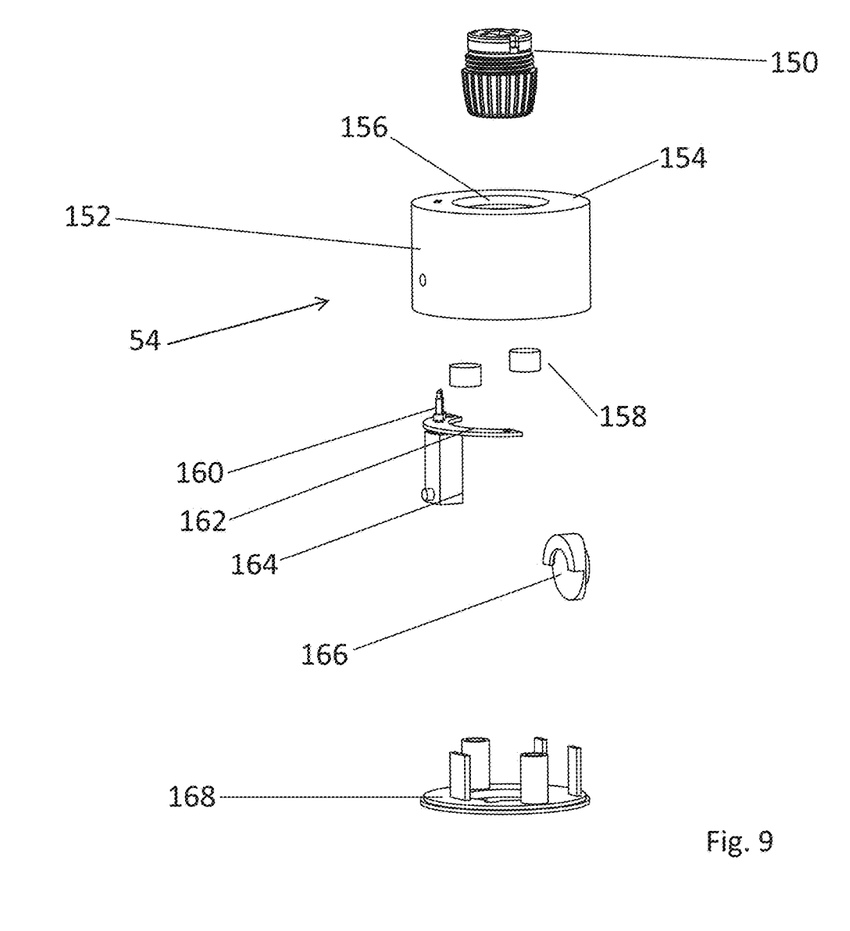
FIG. 9 is a simplified diagram illustrating construction of a socket according to an embodiment of the present invention.

Reference is now made to FIG. 9, which is an exploded diagram illustrating the construction of a socket 54 according to the present embodiments. Socket 54 includes a pull cable connector 150 which holds the upper end of cable 64 and which is inserted into bracelet lock 56. Thus, when bracelet lock 56 is pulled away, the cable 64 extends but due to tension, pulls the bracelet lock back to the socket. The pull cable connector 150 is located within socket housing 152 which has an upper surface 154 which is shaped with inclusion 156 to mate with protrusion 144 on the bracelet lock. Within the socket housing 152 are magnets 158 which act with magnets 138 in the bracelet lock to click the socket and the lock together. LED 160 is located on printed circuit board 162 with light guide boss 164, to indicate that charging is in progress.

IR sensor with cover 166 receives IR signals from the bracket. The alarm sensors may thus communicate wirelessly with the alarm system.

Cover 168 provides a bottom cover for the socket which allows the cord and electrical connections through to the mounting.

Figure 10:
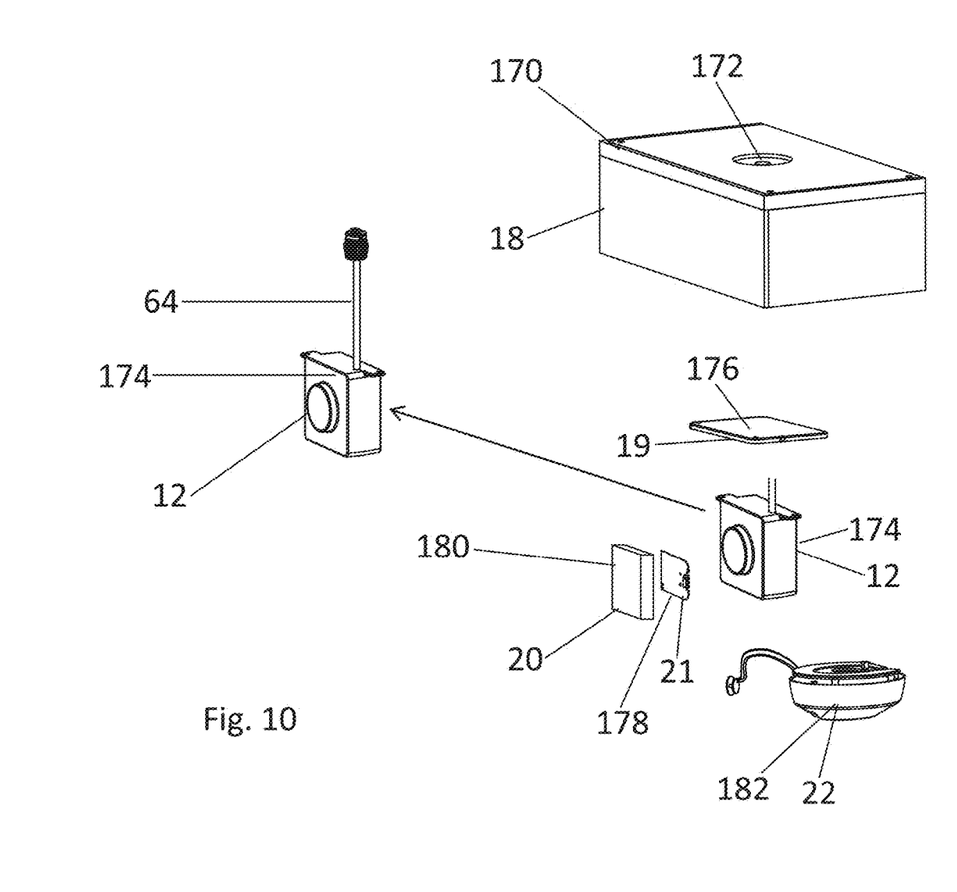
FIG. 10 is a simplified diagram showing the mounting and contents thereof according to an embodiment of the present invention.

Reference is now made to FIG. 10. which is a simplified diagram illustrating mounting 100 and contents thereof. Mounting box 170 may be an independent box or may be a temporary or permanent part of a display cabinet or the like. Receiving hole 172 in the upper part of the box receives socket 54 which may be fixed therein. Pull cable box 174 contains a spring loaded pulley which allows cable 64 to unwind when pulled away but under tension. The cable passes through socket 56 to bracelet lock 54. The cable pulls back the bracelet lock into the socket when the bracelet lock is released and the mutual shape and magnets 138 and 158 act together to locate the bracelet lock correctly in the socket to allow an electrical connection via pogo pin connector 140. Pull cable box 174 may be fixed onto holder 176.

Circuitry for wireless charging 178 is housed in PCB holder 180. Built-in alarm 182 receives signals from the sensors on the bracket and takes alerting action in the event of the wearable being removed when the alarm is set.

Figure 11:
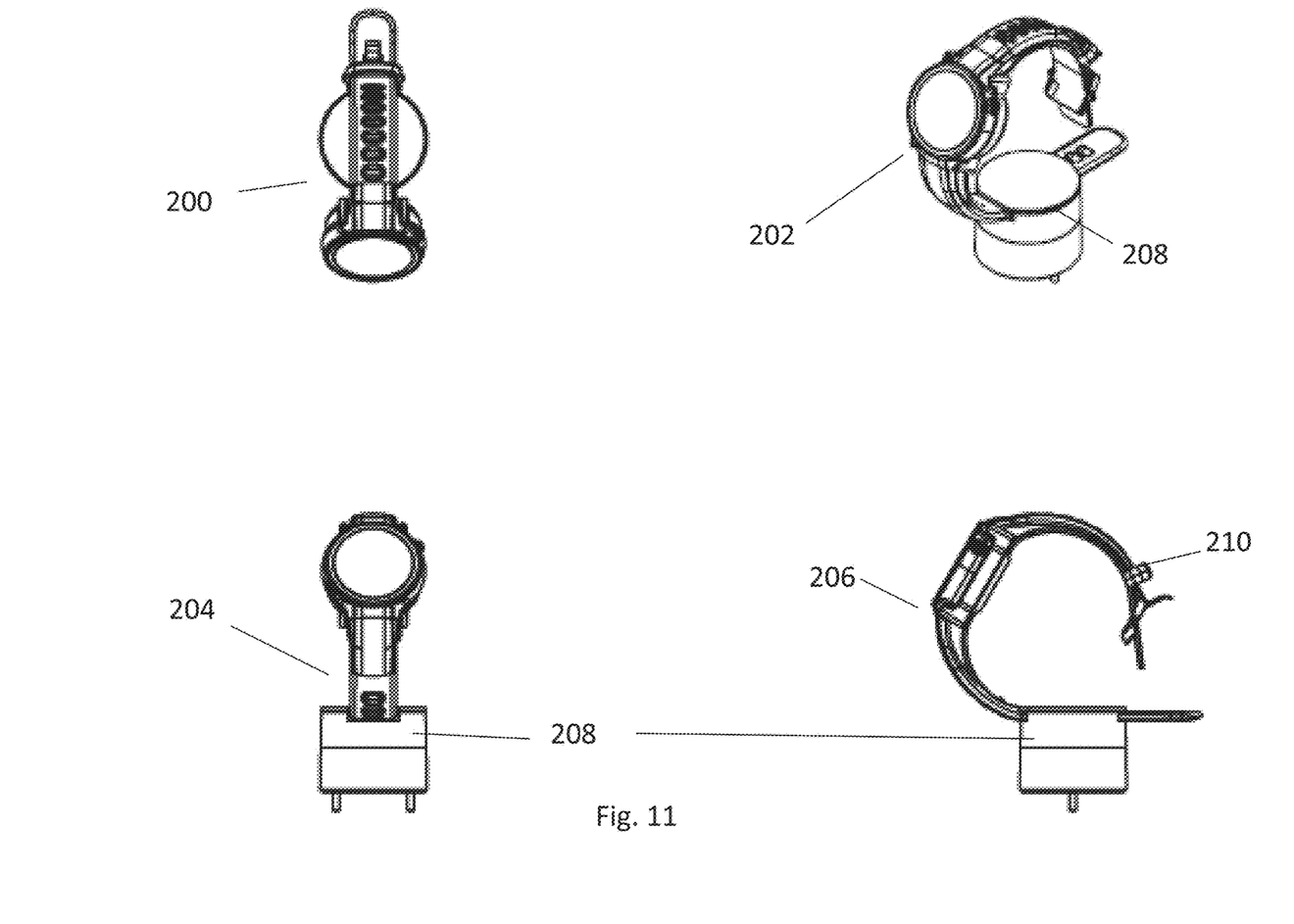
FIG. 11 is a simplified diagram showing another mounting with a watch according to embodiments of the present invention.

Reference is now made to FIG. 11, which is a simplified diagram showing another mounting with a watch according to embodiments of the present invention. The watch is mounted on the display stand and electronically connected. 200 shows the stand viewed from above. 202 shows a perspective view of the watch on the stand. 204 shows the watch from the front, and 206 shows the watch from the side. As in the previous embodiments, the watch is clamped on a band between the bracelet lock 208 and a travel stop 210 that hooks the buckle.

Figure 12:
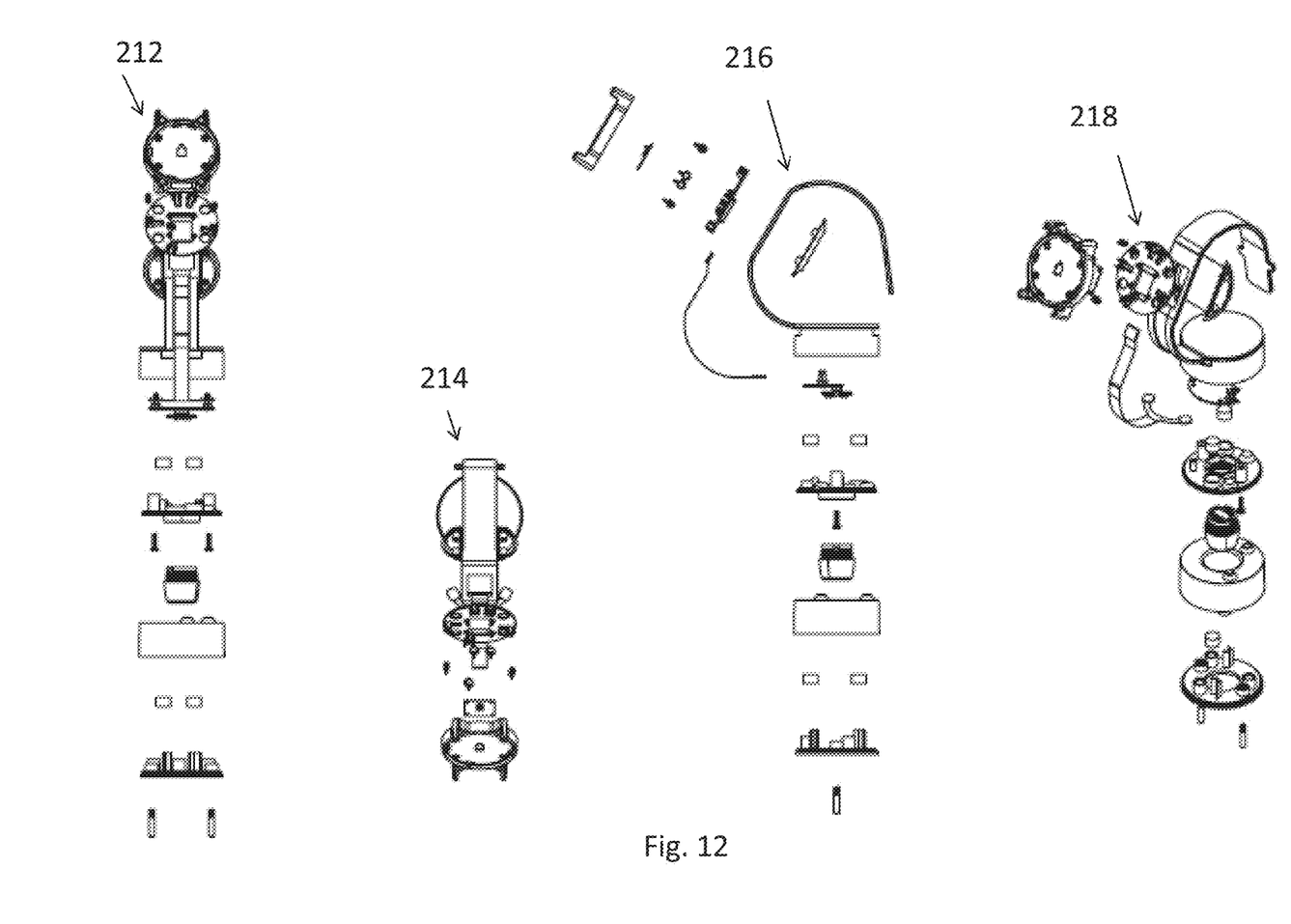
FIG. 12 is a simplified diagram showing an exploded view of the mounting of FIG. 11.

Reference is now made to FIG. 12, which is a simplified diagram showing an exploded view of the mounting of FIG. 11. 212 is a front exploded view of the mounting. 214 is a rear exploded view of the mounting. 216 is a side exploded view of the mounting, and 218 is a side perspective exploded view of the mounting.

Figure 13:
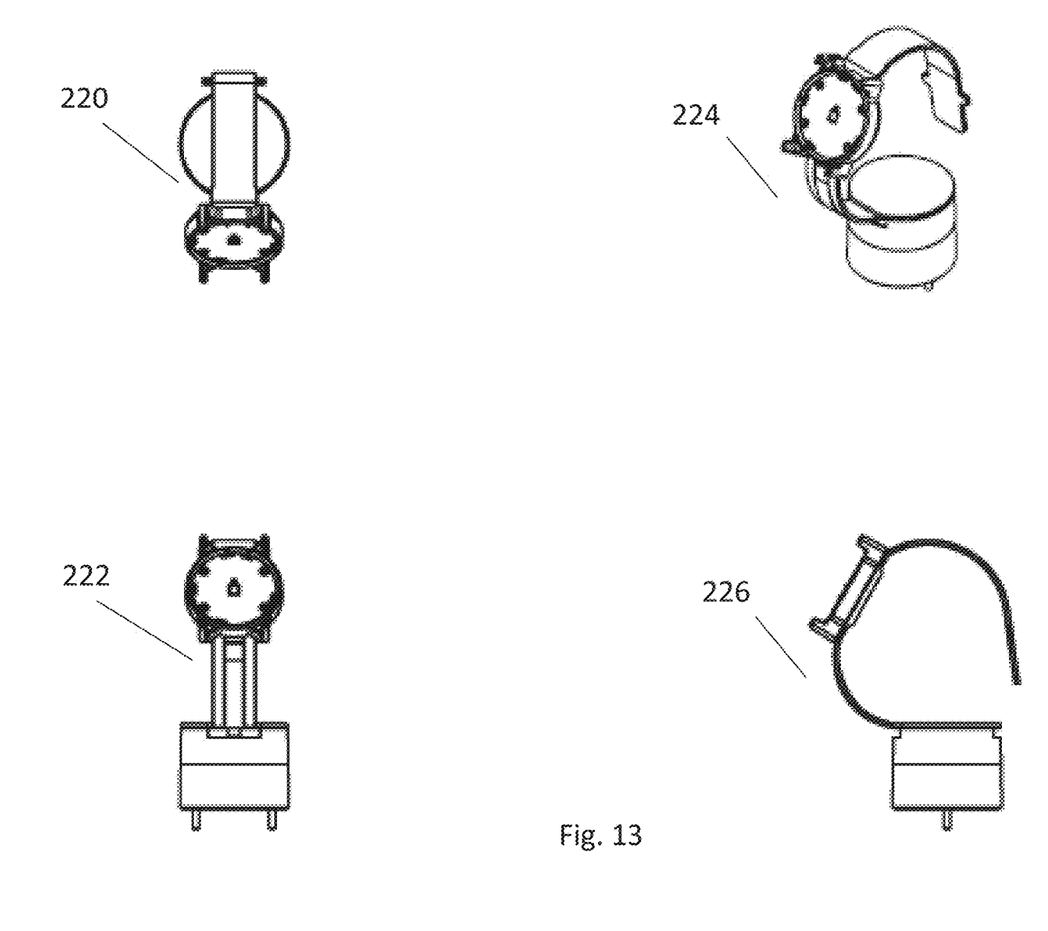
FIG. 13 is a simplified diagram showing the mounting of FIG. 11 without the watch.

Reference is now made to FIG. 13, which is a simplified diagram showing the mounting of FIG. 11 without the watch. 220 shows the mounting from above. 222 shows the mounting from the front. 224 shows a perspective view of the mounting and 226 shows a side view of the mounting.

It is expected that during the life of a patent maturing from this application many relevant wearables will be developed and the scope of the term 'wearable' is intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written.

Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A secure display stand for a wearable comprising:
    a socket;
    a bracelet lock for locking around a bracelet or strap of a wearable to be displayed; and
    a bracket extending from said bracelet lock, the bracket having a charging element for charging of said wearable, wherein the bracelet lock is attached by a retractable cord to the socket, wherein said bracelet lock comprises a body and a cover releasably attached to said body, said bracket extending from said cover, and wherein said body and said cover when attached to said body define an insertion space between said body and said cover, said insertion space being large enough for said strap or bracelet to fit through, said cover further being tightened over said insertion space onto said body to hold said strap or bracelet firmly in said space.

2. The secure display stand of claim 1, having a retracted position in which said bracelet lock is located in said socket and an extended position in which said bracelet lock is pulled away from said socket to allow a customer to wear or inspect said wearable.

3. The secure display stand of claim 1, wherein said bracket comprises an arc and is configured to fit under said strap or bracelet.

4. The secure display stand of claim 3, wherein said bracket is configured to hold said strap or bracelet open as if being worn.

5. The secure display stand of claim 1, wherein said charging element is located at a distance from said bracelet lock to engage a housing of said wearable.

6. The secure display stand of claim 1, wherein said charging element and said bracket form a continuum.

7. The secure display stand of claim 1, wherein said charging element is configured for wireless charging of said wearable.

8. The secure display stand of claim 1, wherein said charging element is configured to engage a charging contact of said housing.

9. The secure display stand of claim 1, wherein said charging element comprises a back plate continuous with said bracket and a modular charging cap for engagement with said wearable, wherein said modular charging cap is exchangeable.

10. The secure display stand of claim 1, comprising said wearable being displayed thereon, said strap or bracelet of said wearable comprising a buckle, said bracket being configured with a travel stop at an end opposite said cover to hook said buckle onto said bracket.

11. The secure display stand of claim 1, further comprising an alarm set to provide an indication of either one or both of detachment of said housing from said charging plate and removal of said strap or bracelet from said bracelet lock.

12. The secure display stand of claim 1, configured to charge the wearable through said charging element at least when in said retracted position.

13. A method of displaying wearables in electronically activated manner, respective wearables having a housing and a strap or bracelet with a buckle, the method comprising:
    mounting a wearable on an open arc-shaped bracket, the bracket being connected to a mounting via a tensioned cord, to allow an extended position for said wearable for inspection,
    hooking said buckle onto a first end of said bracket,
    locating said housing onto a charging element on said bracket,
    closing a bracelet lock at a second end of said bracket over said bracelet or strap;
    supplying power to said wearable via said bracket and said charging element; and
    sensing said wearable, such that removal of said wearable triggers an alarm.

* * * * *